J. H. SINKINSON.
Lathes.

No. 153,985. Patented Aug. 11, 1874.

WITNESSES:
A Bennewendorf
C Sedgwick

INVENTOR:
J. H. Sinkinson
BY
Munn & Co.
ATTORNEYS.

THE GRAPHIC CO. PHOTO-LITH. 39 & 41 PARK PLACE, N.Y.

UNITED STATES PATENT OFFICE.

JOHN H. SINKINSON, OF NEWARK, NEW JERSEY.

IMPROVEMENT IN LATHES.

Specification forming part of Letters Patent No. 153,985, dated August 11, 1874; application filed May 23, 1874.

*To all whom it may concern:*

Be it known that I, JOHN H. SINKINSON, of Newark, in the county of Essex and State of New Jersey, have invented a new and useful Improvement in Lathes, of which the following is a specification:

The invention is an improvement in spool-lathes; and consists in the construction and arrangement of parts as hereinafter described, and specifically indicated in the claims.

Figure 1:
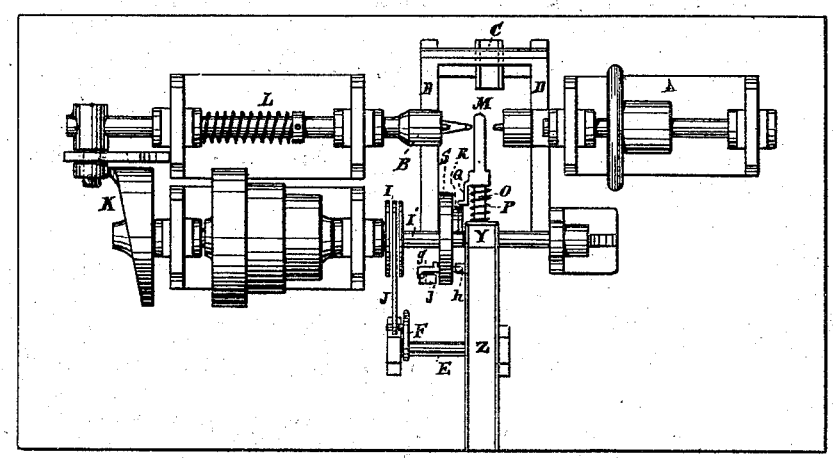
Figure 4:
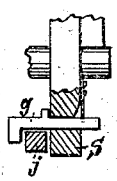
Figure 2:
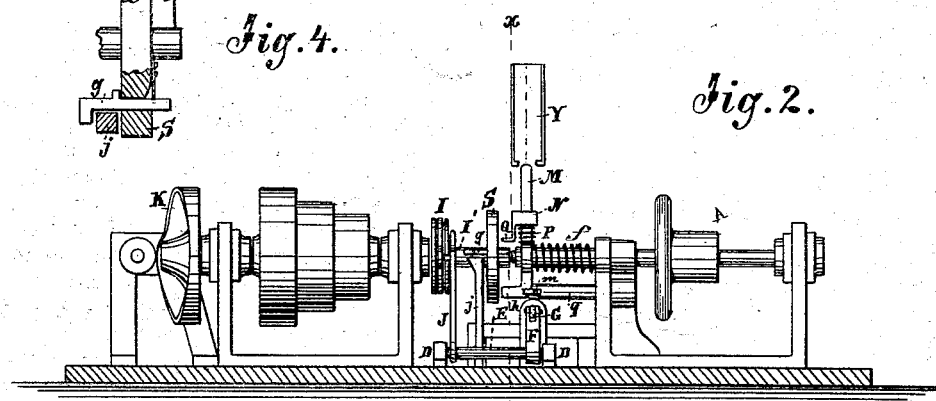
Figure 5:
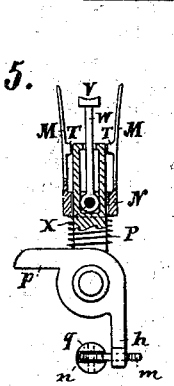
Figure 3:
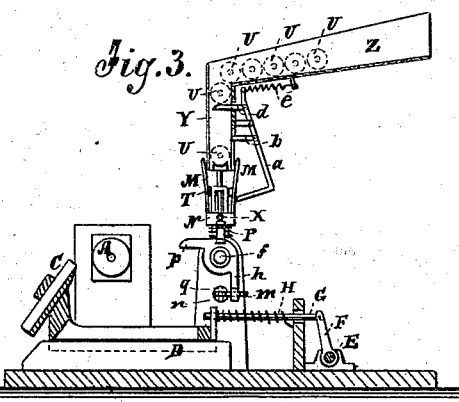
Figure 6:
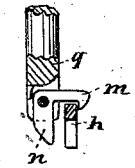

Figure 1 is a plan view of my improved machine. Fig. 2 is a side elevation. Fig. 3 is a transverse section of the machine taken on the line $x\,x$ of Fig. 2. Fig. 4 is a detail view of the apparatus for turning the carrier. Fig. 5 is a detail of the carrier. Fig. 6 is a detail of the catch for holding the carrier.

Similar letters of reference indicate corresponding parts.

A is the live spindle; B, the tail-center; and C, the cutter of the lathe for turning the spools. The cutter is moved up to the work for turning the spool, and away from it for allowing the spool to be discharged in ways D, being worked by the rock-shaft E, arm F, rod G, and spring H, and the rock-shaft being worked by an eccentric, I, on the shaft I' and connecting-rod J. The tail-center of the lathe is moved back to discharge the spool by a cam, K, and forward to secure the spool by a spring, L. In order to apply the blanks automatically to the lathe, and thus save the labor of feeding them by hand, I propose to employ a pair of spring-fingers, M, connected to a collar, N, or other device on the arm O, so as to slide out and back on said arm and open and close, and provide the collar with a spring, P, to pull it back, and an arm, Q, for forcing it out by running over the cam R on the disk S, or its shaft. When the spring P pulls the fingers back, it opens them at the same time by the lugs T striking the ends of the arm, so that they are prepared to receive the spool-blanks V between them; and when they are pushed out by the cam R they close on the blank and hold it. The spool-blank is received on a little rest between the fingers, which move out and in with them, being supported on a stem, W, which extends in the hollow arm O to the pin X, which connects it to the collar, and works up and down in a slot in the arm. The spool-blanks are delivered to the fingers from the vertical conductor Y, into which they descend from the inclined conductor Z, one being let fall into it each time the fingers come to their position under it, by the arm O pushing the lever $a$, and withdrawing the stop-pin $b$ from under the lowermost blank, and, at the same time, moving the stop-pin $d$ under the next block above to prevent the descent of any more blocks until the stop $b$ moves back again, which takes place as soon as the carrier moves forward to present the block to the lathe, and allow the lever $a$ to swing back, said lever being moved by the spring $e$. When the arm O comes back again it strikes lever $a$, and again moves it into the position represented in Fig. 3, and frees another block to let it fall into the fingers. This arm O, on which the carrying-fingers M are mounted, is mounted on a rock-shaft, $f$, which is turned by a tappet, $g$, on the disk S coming against the end of arm $h$, to swing the carrier down between the lathe-centers, as represented in Fig. 1, to present the block to them; but just before the carrier is thus swung down, it is pushed outward along the arm O by the cam R, so as to extend it to reach the spool-blank to the axis of the lathe, and also to allow the fingers to escape from the spool-blank by sliding back on the arm after the blank is secured. The carrier is prevented from moving too far by the arm $p$ striking against the rod. The arm Q escapes from the cam R the moment the spool-blank is secured by the tail-center B, and, at the same time, the tappet $g$ escapes from the arm $h$ by a cam on a post, $j$, along which a hooked part of the tappet $g$ passes, drawing it through the disk S, in which it is made to slide, when a spring on a shaft, $f$, swings the arm O back to the place for receiving the blanks. The tappet $g$ will be moved back ready to engage the arm $h$ again by a spring. The point to which the arm swings back will be controlled by an adjusting-screw. The cam is locked in this position by a catch, $m$, which is unfastened by the tappet $g$ striking it just before it engages the arm $h$ for swinging the carrier.

Having thus described my invention, I claim as new and desire to secure by Letters Patent—

1. The spring-fingers M, mounted on a rocking arm, O, so as to slide forward and back on it, a cam to slide them out, and a spring to slide them back, combined with the lathe centers, substantially as described.

2. The spring-fingers M, and rock-arm O, combined with the conductor Y, lever *a*, and stops *b d*, substantially as specified.

3. The spring-fingers M, lugs T, collar N, spring P, arm Q, and cam R, combined substantially as specified.

4. The tappet *g*, cam-stud *j*, rotary disk S, and spring, combined with the arm *h* of the rocking arm of the spool-carrier, substantially as specified.

JOHN H. SINKINSON.

Witnesses:
T. B. MOSHER,
ALEX. F. ROBERTS.